United States Patent [19]

Gebhart et al.

[11] 4,428,656

[45] Jan. 31, 1984

[54] 360° VIEW CAMERA

[75] Inventors: John R. Gebhart, Enfield, Conn.; Francis X. Ledoux, Springfield, Mass.

[73] Assignee: United Technologies Corporation, Hartford, Conn.

[21] Appl. No.: 411,941

[22] Filed: Aug. 26, 1982

[51] Int. Cl.³ ............................................. G03B 37/00
[52] U.S. Cl. ....................................... 354/80; 354/63; 354/96; 374/162
[58] Field of Search ....................... 354/63, 77, 80, 94, 354/95, 96, 98; 73/104, 105; 374/137, 162; 116/207

[56] References Cited

U.S. PATENT DOCUMENTS

| | | | |
|---|---|---|---|
| 2,737,864 | 3/1956 | Gutterman et al. | 354/63 |
| 2,894,436 | 7/1959 | Eber et al. | 354/63 |
| 2,986,980 | 6/1961 | Morris | 354/96 |
| 3,099,946 | 8/1963 | Burton et al. | 354/99 |
| 3,185,057 | 5/1965 | Hearon et al. | 354/96 |
| 3,191,182 | 6/1965 | Caldwell et al. | 354/96 |
| 3,244,085 | 4/1966 | Pulfer | 354/63 |
| 3,651,695 | 3/1972 | Brown | 116/207 |
| 4,215,275 | 7/1980 | Wickersheim | 374/137 |

Primary Examiner—A. A. Mathews
Attorney, Agent, or Firm—Norman Friedland

[57] ABSTRACT

A 360° view camera for taking photographs of the interior of a cylinder or cone includes a rotating mirror disposed 45° about the axis of rotation which is in coincidence with the cylinder or cones centerline that is parallel to a rotation mirror mounted in the film magazine. A slit in the film magazine exposes a stationary flat sheet film wound around a cylinder to a lens that is in line of sight with the rotating mirrors. Adjustment means are provided to eliminate distortions of the specimen being photographed.

2 Claims, 1 Drawing Figure

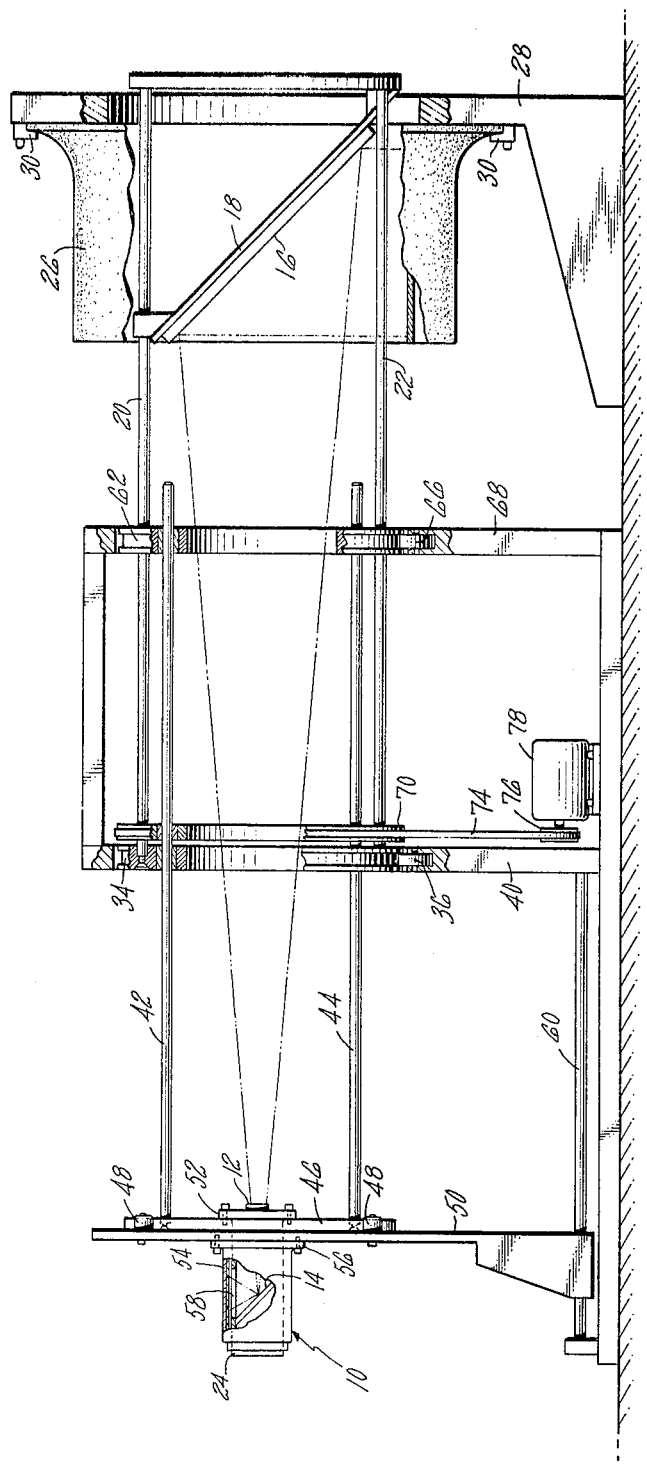

360° VIEW CAMERA

CROSS REFERENCE

This patent application relates to the photographing equipment for taking 360° views of a cylinder or cone disclosed in a patent application entitled 360° View Camera filed by the same inventors on even date and assigned to the same assignee as this patent application.

TECHNICAL FIELD

This invention relates to cameras for taking 360° view pictures and more particularly for taking pictures of the inner diameter of a cylindrical or conical surface so that the picture conforms to a developed view of the surface photographed.

BACKGROUND ART

Often times it is desirable to show a developed view of a curved surface wherein the negative is relatively free from aberrations due to complex angles and from an uneven intensity due to varying lighting of the surface being filmed. Historically, the industry has witnessed a number of cameras for taking panoramic views and particularly of the slit type. A problem that has been prevalent in the industry is the vertical lines that result from uneven movement of the film. In the intended use of the film to which this invention is addressed such "banding" is unacceptable. The film should not only be free from "banding" but should have minimum distortions due to uneven lighting and varying color intensity due to the angle being focused.

We have found that mounting the flat stock film on a cylinder in an enclosed magazine and holding this film stationary and exposing the film to the object through a rotating fixed slit oriented in line with a suitable lens and rotating a pair of parallely spaced mirrors one directing the image of the part being photographed and the other directing the image to the negative through the slit produces a uniform negative that is relatively free from distortions. The intended use of this film is for automated temperature indicating paint analysis utilizing digitizing and computing techniques.

DISCLOSURE OF INVENTION

An object of this invention is to provide camera means for taking 360° developed view of the inner diameter of a cylindrical or conically shaped surface and characterized by minimizing aberrations, distortions and uneven light intensities. A feature of this invention is to rotate together a pair of parallely spaced mirrors where one focuses the image onto the lens and the other focuses the lens onto the film through a rotating slit.

Other features and advantages will be apparent from the specification and claims and from the accompanying drawings which illustrate an embodiment of the invention.

BRIEF DESCRIPTION OF THE DRAWING

The sole FIGURE is a view in elevation and partly in section schematically illustrating this invention.

BEST MODE FOR CARRYING OUT THE INVENTION

While this invention describes in its preferred embodiment the camera adapted to photograph the inner diameter of a burner can for a gas turbine engine, as will be obvious to one skilled in this art, the camera is adaptable for use whenever a 360° view of the interior of a cylinder or cone is desired.

The camera comprises a film magazine generally illustrated by reference numeral 10, lens 12 and a pair of axially spaced parallel mirrors 14 and 16, both of which are disposed 45° relative to the rotating axis. Mirror 16 is mounted on the mirror support 18 affixed to the rods 20 and 22 and mirror 14 is supported in the rotating cylinder 24.

Can 26 is retractably supported to frame 28 and secured in position by clamps 30. Rods 20 and 22 are joined in rotating disc 34, which disc is supported for rotating movement by rollers 36 (one being shown) supported by the frame member 40.

Rods 42 and 44 are joined into rotating disc 46 that is rotatably supported by a plurality of rollers 48 supported to frame member 50. The lens is supported in the hollow cylinder 24 which carries flange 52 affixed to disc 46. From the foregoing it is apparent that lens 12 and cylinder 24 rotate with discs 62 and 34. The magazine 10 comprises an enclosed hollow cylinder 54 opened at the forward end to be exposed to the lens. Flange 56 carried at this end affixes to the frame 50 and a simple securing structure for easy removal of the magazine is preferred. Hence, the magazine can readily be loaded with film which preferably is a ten inch by four inch sheet that is secured to the inner diameter of fixed cylinder 54 adjacent the rotating cylinder 24. A slit 58 is formed in rotating cylinder 24 exposing the film to the image produced by mirror 14.

The film magazine is preferably provided with a cover (not shown) that allows the magazine to be loaded with film inserted in position on the fixture, and the cover being removable when the photographing operation commences.

The frame member 50, and hence magazine 10 and lens 12 are movable rectilinearly to remove vertical distortions from the image of the inner wall of can 26 and lens 12 may be movable rectilinearly in any known manner for adjusting the focal point. This is accomplished when the magazine is removed and a ground glass is inserted in its position. To position the frame 50, the frame 50 is guided along the fixed rod 60 and rods 42 and 44 slide in openings in rotary discs 34 and 62. Disc 62 is similar in construction to disc 34 and is rotary supported by rollers 66 (one being shown) to frame member 68. A sprocket gear 70 attached to rods 20, 22, 42 and 44 for rotary movement is driven by chain 74 driven by the gear 76 attached to a suitable variable motor 78.

In operation, once the image is focused and the object properly aligned, the film loaded magazine is inserted, the motor actuated for one revolution concomittantly rotating mirrors 18 and 14. The slit 58 exposes the image to the film for that complete revolution. Of course, a light source suitably attached to one of the rods 20 or 22 (not shown) supplies illumination during the photographing of the can 26.

This provides a developed view of the interior of the can 26 and because of the focusing, the uniform lighting, and the constant distance of the object being photographed to the lens, the negative is relatively free from distortions and varying light intensities allowing the film to be used for automated temperature indicating paint analyses. The photograph can then be digitized in a well known manner and the digitized information can be processed through a computer to be transformed into temperature values sensed from the color and intensities of the photographed burner can, which had previously been painted with temperature indicating paint and exposed to a test environment. To correct for such variables as lighting, exposure and film processing, a calibration strip with known temperature values can be inserted on the negative in the photographing process.

For this method of burner can temperature analysis the preferred embodiment would utilize Varicolor II Professional Type (L) film balanced for 3200° F. tungsten illumination and for the development process Flexicolor C-41 is used.

It should be understood that the invention is not limited to the particular embodiments shown and described herein, but that various changes and modifications may be made without departing from the spirit and scope of this novel concept as defined by the following claims.

We claim:

1. A camera for photographing the interior of a cylindrical or conical shaped surface of a specimen including a fixture for supporting said specimen in fixed relationship on one end of said fixture, a lens rotatably mounted on the other end of said fixture, a film magazine for supporting a film, said magazine including a fixed hollow cylindrical member fixedly supported therein for receiving a flat film wrapped therearound, a first mirror mounted in said magazine at a 45° angle relative to the axis of rotation of said first mirror, another cylindrical member in rotating relationship to said fixed cylinder and rotatable with said lens, a second mirror parallely mounted relative to said first mirror and positioned to transmit the image of said inner surface of said specimen and means for imparting rotary motion in synchronous relationship to said first mirror, said second mirror and said lens for exposing said film to said image through a slit opening formed in said other cylindrical member.

2. A camera as in claim 1 including a carriage for supporting said lens and magazine, a lens carrying member, rods attached to said lens carrying member, a gear member interconnecting said rods for transmitting rotary motion to said lens carrying member, said carriage being movable in a rectilinear motion for positioning said lens relative to said second mirror and said rods being slidable in openings formed in said fixture, and means for imparting rotary motion to said gear member.

* * * * *